United States Patent [19]

Moses

[11] 4,305,826

[45] Dec. 15, 1981

[54] METHOD AND APPARATUS FOR SOFTENING AND FILTERING WATER

[75] Inventor: Ray E. Moses, Glendale, Ariz.

[73] Assignee: United Standard Management Corporation, Phoenix, Ariz.

[21] Appl. No.: 202,141

[22] Filed: Oct. 30, 1980

[51] Int. Cl.³ .......................... C02F 1/42; B01D 23/10
[52] U.S. Cl. .................................... 210/687; 210/694; 210/290
[58] Field of Search ............... 210/681, 687, 694, 670, 210/672, 275, 278, 282, 284, 290, 269

[56] References Cited

U.S. PATENT DOCUMENTS

| | | | |
|---|---|---|---|
| 1,997,830 | 4/1935 | Michaud | 210/290 |
| 2,162,809 | 6/1939 | GroaK | 210/290 |
| 2,605,901 | 8/1952 | Morrison | 210/282 |
| 3,148,962 | 9/1964 | Dellinger | 210/290 |
| 3,201,346 | 8/1965 | Benedict | 210/282 |
| 3,204,770 | 9/1965 | Brink | 210/282 |
| 3,664,506 | 5/1972 | Meunier | 210/284 |
| 3,715,035 | 2/1973 | Teeple | 210/284 |
| 3,735,895 | 5/1973 | Roper | 220/468 |
| 4,054,526 | 10/1977 | Muller | 210/282 |
| 4,094,778 | 6/1978 | Denny | 210/687 |

FOREIGN PATENT DOCUMENTS 50-47446  4/1975  Japan .................................... 210/290

Primary Examiner—Ernest G. Therkorn

[57] ABSTRACT

Method of and a multilayered filter for softening and filtering water. The water to be softened and filtered flows through a first layer of particles of activated carbon, a second layer of beads of an organic ion cation exchange resin, a third layer of granules of sodium aluminium silocate, and a fourth layer of grains of filter sand which layers are arranged vertically in a tank. The filter comprises the four above identified layers of filter materials.

10 Claims, 1 Drawing Figure

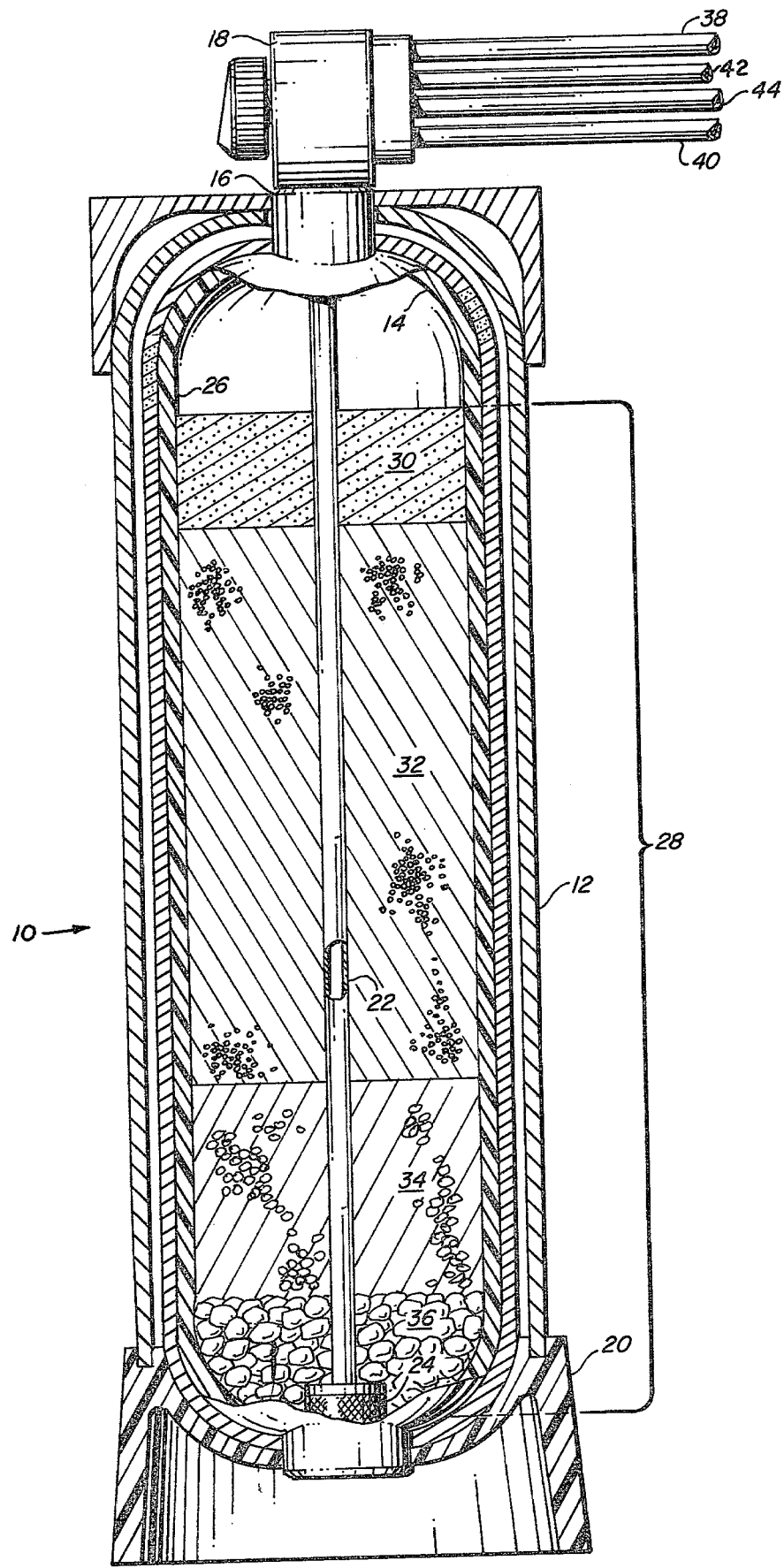

METHOD AND APPARATUS FOR SOFTENING AND FILTERING WATER

BACKGROUND OF THE INVENTION (1) Field of the Invention

This invention is in the field of water treating systems in which water typically as furnished by a water utility, or from wells, is softened and filtered by being passed through a regenerative filter including cation ion exchange media. More particularly, this invention relates to a multilayer filter for producing water which has been softened and from which substantially all visible particles have been removed.

(2) Description of the Prior Art

Hardness in water is the result of the presence of certain cations, notably those of calcium, $CA^{2+}$ and magnesium, $Mg^{2+}$. Hard water has many undesirable characteristics one of which is to form a precipitate with soap. When heated, hard water forms precipitates, the composition of which depends upon the anions present. A most common anion, particularly in surface water, is the $HCO_3^-$ ion formed by the reaction of carbon dioxide $CO_2$ with water $H_2O$. When a solution contains $CA^{2+}$ and $HCO_3^+$ ions is heated, calcium corbonate $CaCO_3$ forms. If the sulfate ion $SO_4^{-2}$ is present, crystals of calcium sulfate are formed which in certain circumstances produce a tightly adherent scale.

One of the oldest methods of softening water includes the addition of slaked lime $Ca(OH)_2$ and soda ash $Na_2CO_3$. This method has lost favor because of its many economic disadvantages compared with the ion exchange method of water softening in which the water to be treated need not be analyzed, reagents need not be added in specific amounts, and there is no precipitate to be removed. The ion exchange method is applicable to large or small scale operations for the treatment of the water supply for the home or for industry. The initial ion exchange media were a class of substances known as zeolites which contain atoms of aluminum, silicon, and oxygen which are bonded into vast anionic networks, or lattices. The negative charges of the networks are compensated by a large number of $Na^+$ ions which are positioned within the anionic lattice of a zeolite particle. Zeolites have been superseded as the ion exchange media in most modern water softening systems by organic cation exchange resins such as the crosslinked, polystyrene sulfonate cation exchange resins because such resins have a much higher cation exchange capacity as compared to the zeolites.

A significant advantage of cationic exchange media either an organic or a zeolite, is that such a media can be regenerated as it loses its effectiveness by having more and more of the $Na^+$ ions in the lattices replaced by $Ca^{2+}$ or $Mg^{2+}$ from water as it is being softened. Regeneration is accomplished by passing a concentrated solution of sodium chloride through the cationic exchange media.

Water softening systems have heretofore concentrated on softening water by removing the $Ca^{+2}$ and $Mg^{+2}$ ions from water and replacing them with $Na^+$ ions typically from an organic cation exchange resin. Other problems with the water supplied to the water softening system other than hardness include gases entrapped in the water, which affect odor, taste, and color, examples of which are chlorine and chlorophenols, as well as visible particles entrained in the water, including particles of iron and manganese. In addition the presence of iron or manganese in solution as well as the acidity of the water are problems which water softening systems have heretofore ignored. Where undersirable characteristics other than the hardness of the water were to be changed, they were changed by other apparatus or systems than those responsible for softening.

One problem associated with the use of an organic resin cationic ion exchange medium, such as crosslinked, polystyrene sulfonate cation exchange resins is that the particles, or beads, of the resins are substantially spherical. A bed, or layer, of such beads filters out particles of a size greater than 80 microns. Since particles of a size equal to, or greater than 30 microns are visible to the human eye, passing water through a bed of an organic cation exchange media does not remove substantially all visible particles or turbity. Such water is not polished, where polishing is defined as the removal of substantially all visible particles so that the water sparkles.

SUMMARY OF THE INVENTION

The present invention provides a method of, and a filter for, softening and filtering water by flowing, or passing, the water to be softened and filtered through the multilayer filter. The first, or top, layer of the filter through which the water flows is comprised of very porous activated carbon which adsorbs primarily organic compounds and gases including chlorophenols which adversely affect the taste, odor and color of the water. The activated carbon also adsorbs chlorine. The second layer of the filter through which the water being processed passes is composed of substantially spherical beads of an organic cation exchange resin which softens the water by exchanging $Na^+$ ions of the resin for the $Ca^{+2}$ and $Mg^{+2}$ ions of the water. The third layer of the filter through which the water flows is comprised of granules of zeolite which is a cation exchange material and thus also acts to further soften the water. In addition, due to the irregular shapes of the granules of the zeolite, the granules pack together tightly. A layer of zeolite granules will filter out substantially all particles in the water being processed whose size is greater than 20 microns. As a result the layer of zeolite granules removes substantially all visible particles from the water passing, or flowing through it.

The fourth and bottom layer of the filter through which the water passes is comprised of quartz filtration sand which is positioned around a screen through which the processed water flows after passing through the filter. The size of the grains of said of the bottom, or fourth, layer is chosen to permit high flow rates, and particularly during the back washing to distribute the water flowing upwardly through the filter in such a manner that the flow is uniformily distributed to minimize fluidization of the layers of the filter and consequent intermixing of layers.

It is therefore an object of this invention to provide an improved method of, and filter for, softening and filtering water.

It is yet another object of this invention to provide an improved method of and a filter for softening water and which improves the quality of the water, particularly its taste, appearance, odor, and acidity.

It is still another object of this invention to provide method and apparatus which has an improved capacity for softening water and which filters out substantially all visible particles present in the water.

DETAILED DESCRIPTION OF THE INVENTION

Referring to the drawing, which is a schematic section illustrating the present invention, water softening and filtering system 10 includes a water tank 12, such as is disclosed in U.S. Pat. No. 3,735,895 which issued on May 29, 1973, to Jarold D. Roper. Tank 12 is an elongated cylinder which has a substantially uniform cross-sectional area with rounded upper and lower ends. Upper end 14 is provided with an integral land, or projection, 16. A threaded opening, which is not illustrated, is formed through land 16 and into which a threaded projection of control valve assembly 18 is threaded to removably secure control assembly 18 so that tank 12 is substantially vertical when base 20 is placed on a substantially horizontal surface. Pipe 22 is connected at its upper end to control valve assembly 18. Filter screen 24 which is connected to the bottom end of pipe 22 permits water to flow into or out of pipe 22.

The inner wall 26 of tank 12 defines the interior thereof, which is partially filled by multilayered filter 28. The top, or first, layer 30 is comprised of particles of activated carbon which have a balanced proportion of large to small diameter pores for adsorbing organic compounds present in the water to be processed. The presence of such compounds in water adversely affects the taste, odor, and color of the water being softened and filtered. The next to the top, or second layer, 32 is comprised of beads of an organic cation exchange resin such as polystyrene sulfonate cation exchange resin, the polymer structure of which is crosslinked styrene/divinylbenzene. Such an organic resin has a high cation exchange capacity and thus is an effective water softening media.

Third layer 34, which is the third layer below top layer 30, is positioned between layer 32 and bottom layer 36. Third layer 34 is composed of granules of zeolite, a sodium aluminum silicate of different and complicated empirical formulas such as ($NaAlSi_3O_8$, $NaAlSi_2O_6$) etc., a cation ion exchange material the granules of which have an irregular shape so that the granules pack tightly together. The tightly packed granules of zeolite of layer 34 filter out much smaller sized particles present in the water being processed down to particles of 20 microns. As a result substantially all visible particles in the water being processed in the range of 30–80 microns are filtered out. It should be noted that particles whose sizes are greater than 80 microns are filtered out as the water being processed flows through first and second layers 30, 32. As a result the water passing through layer 34 is further softened as well as filtered so that it is very clear. A filtering process which removes substantially all visible particles is sometimes referred to as one which polishes the water, so the water passing through layer 34 is polished. The media or granules of layer 34 also removes iron in water being processed whether particulate or dissolved or both, as well as manganese. The zeolite granules of layer 34 also provide a correction to the acidity of the water being processed. The decrease in acidity is approximately 0.3 pH units if the pH of the water being processed has a pH of 6.5. If the acidity of the water is greater than 6.5 pH; i.e., the pH is less than 6.5, the zeolite granules will provide some, but a lesser amount of pH correction.

The fourth, or bottom layer, 36 is composed of grains of filtration sand. The size of the grains is chosen to maximize rates of flow of water through screen 36, to support layer 34 while simultaneously minimizing intermixing of layers 36 and 34; and 32 and 30 which mixing is most likely to occur during the backwash cycle of system 10 when water may flow out of pipe 22 through filter screen 24 at its maximum rate. Layer 36 functions to distribute the flow of water particularly during the backwash cycle so that the flow of water per unit area at the boundary between layers 36 and 34 is substantially uniform across the whole area of the interface. When system 10 is in its water processing mode, water to be processed is supplied by inlet pipe 38 which is connected to control valve assembly 18. Water from inlet pipe 38 flows into the top of tank 12. After the interior of tank 12 is substantially full of water and all air in the tank 12 has been removed from system 10 which occurs during system initialization, water to be processed flows downwardly through layers 30, 32, 34 and 36. The function of each layer on the water flowing, or passing through it, is as described as above. The water after passing through all the layers of filter 28, flows through screen 24 up through pipe 22 to outlet pipe 40 which permits water after being softened and filtered by passing through filter 28 to be connected to and distributed through the distribution system of the user of system 10. Periodically, as a function of the hardness of the water being processed and the amount of particulate matter entrained therein, filter bed 28 must be regenerated and cleaned by flushing out particulate matter filtered out of the water during the processing cycle.

Depending upon the type of control valve assembly 18 provided, the regeneration and backwash cycles can be combined or can be accomplished separately. To regenerate the ion exchange media of layers 32 and 34 control valve assembly 18 is set to cause a saturated salt solution which is supplied through pipe 42 from a conventional salt storage tank, which is not illustrated, to flow into the interior of tank 12. If the regeneration and backwash cycles are combined, first the saline solution is caused to flow down through pipe 22, out through filter screen 42 and upward through filter 28 and out through drain pipe 44, followed by water from inlet pipe 38 during the backwash cycle. If the regeneration and backwash cycles are not combined, the saline solution from pipe 42 preferably enters the top of tank 12 and flows downwardly through filter 28 up through pipe 22 and into drain pipe 44. As the substantially saturated salt solution flows through layers 32 and 34 in either an upwardly or downwardly direction, sodium ions $Na^+$ from the NaCl in solution replace the calcium $Ca^{+2}$ and magnesium $Mg^{2+}$ ions in the lattices of the cationic ion exchange media of layers 32 and 34, as is well known in the art, to regenerate the cation exchange media of layers 32 and 34. During the backwashing cycle whether combined with or separate from the regeneration cycle control valve assembly 18, after the completion of the regeneration cycle, causes water from inlet pipe 38 to flow downwardly through pipe 22 through filter screen 24. Drain line 44 is at the same time connected to the top of tank 12 so that water flowing upwardly through filter 28 will flow through pipe 44 to a waste water disposal system, such as a sewer, for example. The backwash cycle is continued until substantially all particles that have collected or trapped in filter 28 during the prior processing cycle have been washed out of filter 28 as well as all of the saline solution introduced into tank 12 during the regeneration cycle.

The activated carbon particles of layer 30 are not regenerable, but have a very long useful life in most applications so that layer 30 need not be removed and replaced over a period of several years. When necessary, layer 30 can be replaced or additional activated carbon can be added by removing control valve assembly 18 from tank 12 to provide access to the interior of tank 12. Tank 12, in the preferred embodiment, has an internal diameter of substantially 9 inches and is 48 inches long.

To prevent the zeolite granules of layer 34 from being adversely affected by the acidity of the water being processed, it is necessary that a slight amount, in the range of 6 ppm, of silica $SiO_2$ be present in the water being processed. If enough silica is not present in the water being processed, silica can be added to the water used during the regeneration or backwash cycle to replace silica removed from zeolite granules in the process of reducing the acidity of the water being processed.

In the preferred embodiment, the particles of activated carbon layer 30 are a high capacity carbon. Such activated carbon particles weigh in the range of from 33–36 lbs. per cubic foot. The effective size of the particles of activated carbon is 0.87 mm and their uniformity coefficient is 1.49. The depth of layer 30 in the preferred embodiment is 4 inches.

The organic ion exchange resin of beads of layer 32 is a crosslinked, polystyrene sulfonate cation exchange resin. The polymer is crosslinked styreneldivinylbenzene. The functional structure of the material is $R-SO_3-Na^+$. The weight of resin is 53 lbs. per cubic foot, and the size of the beads is in the range of from 0.46 to 1.2 mm. The thickness, or depth, of layer 32 in the preferred embodiment is 24 inches.

The zeolite granules of layer 34 weighs 55 lbs./cubic ft. The effective size of the granules is in the range of from 0.4 to 1.2 mm. In the preferred embodiment the depth of the layer of zeolite granules 34 is 8 inches.

The quartz sand of layer 36 weighs 93 lbs./cu. ft. The effective size of the grains is substantially 10 mm, and the depth of bed 36 is 3 inches. A suitable source of such filter sand is marketed under the tradename Crystal Amber Sand Aqua No. 2, by the Monterey Sand Co. of Monterey, CA.

The density and particle sizes of the materials forming layers 30, 32, 34, and 36 of filter 28 is such that there is little or no mixing of the materials of the different layers, particularly during the backwashing cycle when such intermixing is most likely to occur. Because of the importance of the filtering capability of the zeolite granules of layer 34 it is important that the integrity of the interface, or boundary between layer 34 and layer 36 and between layer 34 and layer 32 be maintained. The variation in size and density of the particles of the layers 30, 32, 34, and 36 has the result that the integrity of these layers is maintained, or that there is substantially no mixing of the particles of the different layers, during operation of system 10. It should also be noted that the materials of the filter 28 are not adversely affected by the presence of clorine which is commonly used to disinfect, or purify water supplied to system 10.

What is claimed is:

1. The method of softening and filtering water comprising the steps of:
    passing the water through a first layer of particles of activated carbon, the effective size of the particles being substantially 0.87 mm. with a uniformity coefficient of substantially 1.49;
    passing the water through a second layer of beads of an organic cation ion exchange resin, the size of the beads being substantially in the range of from 0.46 to 1.2 mm.;
    passing the water through a third layer of granules of zeolite, the size of the granules being substantially in the range of from 0.4 to 1.2 mm.; and
    passing the water through a fourth layer of grains of quartz filtration sand, the effective size of sand grains being substantially 10 mm.

2. The method of claim 1 in which the thickness of the first layer is substantially 4 inches.

3. The method of claim 2 in which the thickness of the second layer is substantially 24 inches.

4. The method of claim 3 in which the thickness of the third layer is substantially 8 inches.

5. The method of claim 4 in which the thickness of the fourth layer is substantially 3 inches.

6. A filter for softening and filtering water comprising:
    a first layer of particles of activated carbon, said particles having an effective size of 0.87 mm. with an uniformity coefficient of 1.49;
    a second layer of beads of an organic ion exchange resin beneath the first layer, the size of the beads being substantially in the range of from 0.46 to 1.2 mm.;
    a third layer of granules of zeolite beneath the second layer, the size of the granules being substantially in the range of from 0.4 to 1.2 mm.; and
    a fourth layer of grains of filtration sand beneath the third layer, the effective size of sand grains being substantially 10 mm.

7. A filter as defined in claim 6 in which the thickness of the first layer is substantially 4 inches.

8. A filter as defined in claim 7 in which the thickness of the second layer is substantially 24 inches.

9. A filter as defined in claim 8 in which the thickness of the third layer is substantially 8 inches.

10. A filter as defined in claim 9 in which the thickness of the fourth layer is substantially 3 inches.

* * * * *